United States Patent Office 3,454,208
Patented July 8, 1969

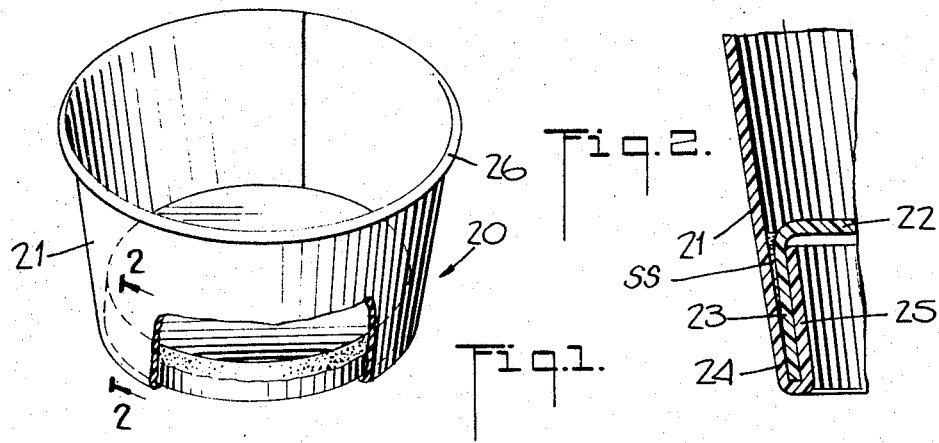
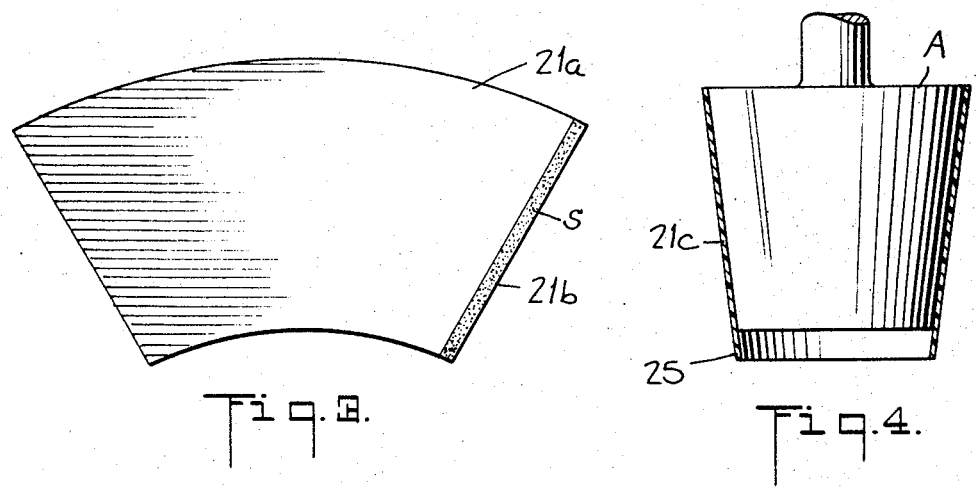
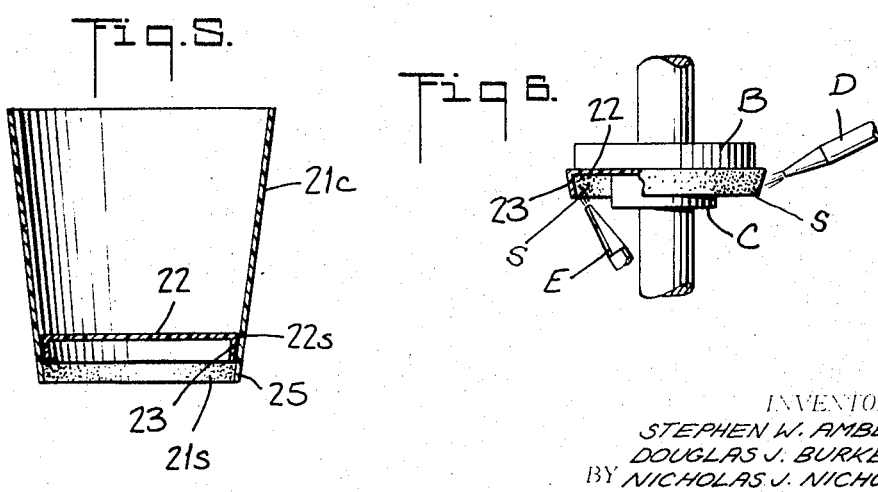

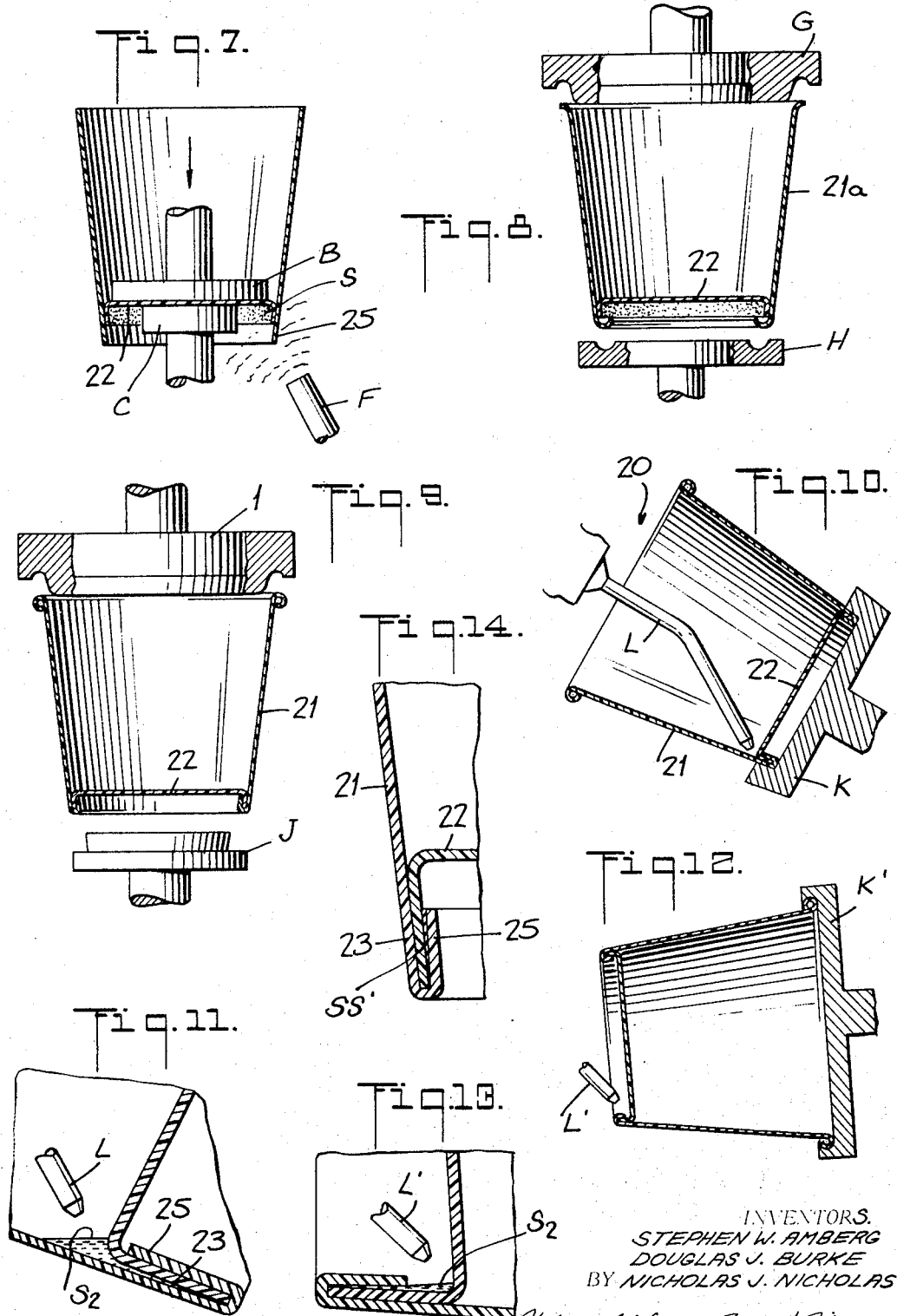

3,454,208
TWO-PIECE PLASTIC CONTAINER
Stephen W. Amberg, St. James, Douglas J. Burke, Smithtown, and Nicholas J. Nicholas, Greenlawn, N.Y., assignors, by mesne assignments, to Owens-Illinois, Inc., Toledo, Ohio, a corporation of Ohio
Filed Feb. 16, 1967, Ser. No. 616,578
Int. Cl. B65d 3/06, 3/12, 3/14
U.S. Cl. 229—4.5                                   5 Claims

ABSTRACT OF THE DISCLOSURE

A two-piece fabricated plastic container comprising a side wall shell consisting of a circumferentially folded sheet of plastic having overlapped longitudinal marginal edges sealed and intimately united by a solvent for said plastic to form a side seam, substantially the full height and circumferential extent of said side wall outer surface being printed, and a bottom member having a peripheral portion sealed and intimately united to the lower end of said shell by a solvent for said plastic, said sealed and intimately united areas providing liquid-tight and air-tight seals; and method of producing same.

Background of the invention

With the advent of plastic containers, these were made in one piece comprising continuous side wall and bottom, those comprising unfoamed plastic material being suitably formed by thermoforming from a sheet of material, by injection molding, etc., and those made of foam plastic material being made by thermoforming from a sheet material or by casting or the like. In such one-piece plastic containers, the only way that printing material such as designs, lettering, etc., could be applied was by holding individual containers by suitable means such as a mandrel and applying the printed material individually to the container side wall. This procedure is slow and costly and makes it almost prohibitive to produce such containers on a commercial price basis.

Summary of the invention

According to the present invention, the plastic container is fabricated from a side wall member and a bottom member, both formed of sheet plastic material, which results in two major benefits: (1) it permits the use of standard machinery and techniques well known in the art for producing two-piece paperboard cups which entails a substantial saving in the cost of equipment, and (2) it provides a further great advantage that the sheet from which the plastic side member is formed may be printed in rolls as in the manner of making paperboard containers and in this way the side wall blanks may be printed so that the printed surface will extend substantially the full height and full circumferential extent of the side wall which would not be possible with one-piece plastic containers and the printing of the side wall blanks in sheet form before the container is fabricated may be accomplished with a far greater speed and substantial saving in cost than possible in the printing of a side wall of one-piece plastic containers.

The side wall member is provided by a body blank cut from a sheet of plastic material containing a plurality of blanks, preferably printed before cutting. The blank is folded circumferentially with opposite overlapped marginal edges secured together in a side seam effected by softening the plastic with a solvent therefor and applying pressure until the overlapped plastic edges are sealed and intimately united. In the presently preferred embodiment, the bottom member is provided with a downwardly extending peripheral flange disposed between the interior of the lower end of said body member and an adjacent inwardly and upwardly extending end portion. The contiguous surfaces of said bottom flange and lower marginal edge of said body member are softened by a solvent for said plastic and pressure is applied to hold the engaging soft surfaces together to seal and intimately unite the same. It is contemplated that other configurations may be used for the cooperating portions on the lower end of said side wall and bottom member periphery instead of the specific configuration herein described, the essential feature requires only that the contiguous portions present cooperating areas which may be sealed and intimately united.

The side seam thus formed provides a dependable liquid-tight and air-tight seal. However, due to the difficulty of effecting adequate and uniform pressure throughout the peripherally extending bottom flange and engaged body end portion, the initial sealing and uniting of the parts together does not provide a dependable seal. We have found that this may be remedied by adding a limited amount of a supplemental solvent to the peripheral end seam at the joint between the body member and bottom member throughout the circumferential extent of said joint. This supplemental solvent is added after the initial solvent sealing and uniting operation and serves to perfect the sealed peripheral end seams. We have found that for the post sealing operation the supplemental solvent should be slower acting than the solvent initially used, as more particularly pointed out hereinafter.

Due to the stresses imposed on the sheet plastic material, it has been noted that crazing or cracking of the side wall 21 of the fabricated container develops. Such stresses are due to the tension in the outer portion of the side wall 21. We have found that this may be relieved after the container has been completed without adversely affecting the structure as a whole by subjecting the outer surface to a suitable temperature sufficient to heat said side wall exterior only to about one-half of the thickness of the plastic material. This is acceptably accomplished by subjecting the entire external surface of the container side wall to heat from an infrared heater by rotating the container as it is moved linearly past said infrared heater.

In the presently preferred form of the invention, high impact polystyrene is used as the plastic material but the invention may be advantageously used with other noncellular plastic sheet materials such as oriented polystyrene, acrylonitrile-butadiene-styrene ("ABS"), cellulose acetate and other cellulosic esters, rigid vinyl chlorides, and acrylic copolymers. Naturally, certain solvents are more effective in solvent sealing some of the above listed plastics than others. Also, a very active solvent can be blended with a less active solvent to give varying degrees of attack. The thickness of the material to be employed will depend in a large measure upon the size and intended use of the containers and the particular plastic used. For very small containers, it is contemplated that material as thin as .005" can be used and for larger containers, such as used for tubs, material as thick as .001" could be employed.

Since the apparatus employed in carrying out the method of our invention and producing the container of our invention is utilized and well known in the production of two-piece paperboard containers and the operations are generally comparable, only such portions of said apparatus will be shown and described as will be necessary to teach those skilled in the art to practice our invention.

Referring to the drawings:

FIG. 1 is a top perspective view, partly in section, of a container embodying our invention;

FIG. 2 is a segmental sectional view taken at 2—2 of FIG. 1;

FIG. 3 is a plan view of the side wall blank before bending to form the side wall shell;

FIG. 4 is a side elevation of a mandrel showing the manner of forming the side wall shell member;

FIG. 5 is a side elevation of a completed side wall shell member;

FIG. 6 is a somewhat diagrammatic view showing a formed receptacle bottom member and the presently preferred manner of applying solvent thereto;

FIG. 7 is a side elevational view, partly in section, diagrammatically showing the positioning of the bottom member in the container body shell;

FIG. 8 is a similar view diagrammatically showing the first step in pre-curling the rim of the body shell member and turning in the bottom of the shell;

FIG. 9 is a similar view diagrammatically showing the final rimming of the mouth of the side wall and the rolling in of the bottom of the side wall;

FIG. 10 is a side elevational view, partly in section, diagrammatically showing the aplication of supplemental solvent to the interior of the rolled-in bottom joint;

FIG. 11 is a somewhat enlarged fragmental sectional view showing the application of the supplemental solvent to the interior of the bottom joint;

FIGS. 12 and 13 are views similar to FIGS. 10 and 11 showing the application of solvent to the exterior of the rolled-in bottom joint;

FIG. 14 is an enlarged fragmental sectional view showing the sealed exterior bottom joint.

Figure 15:
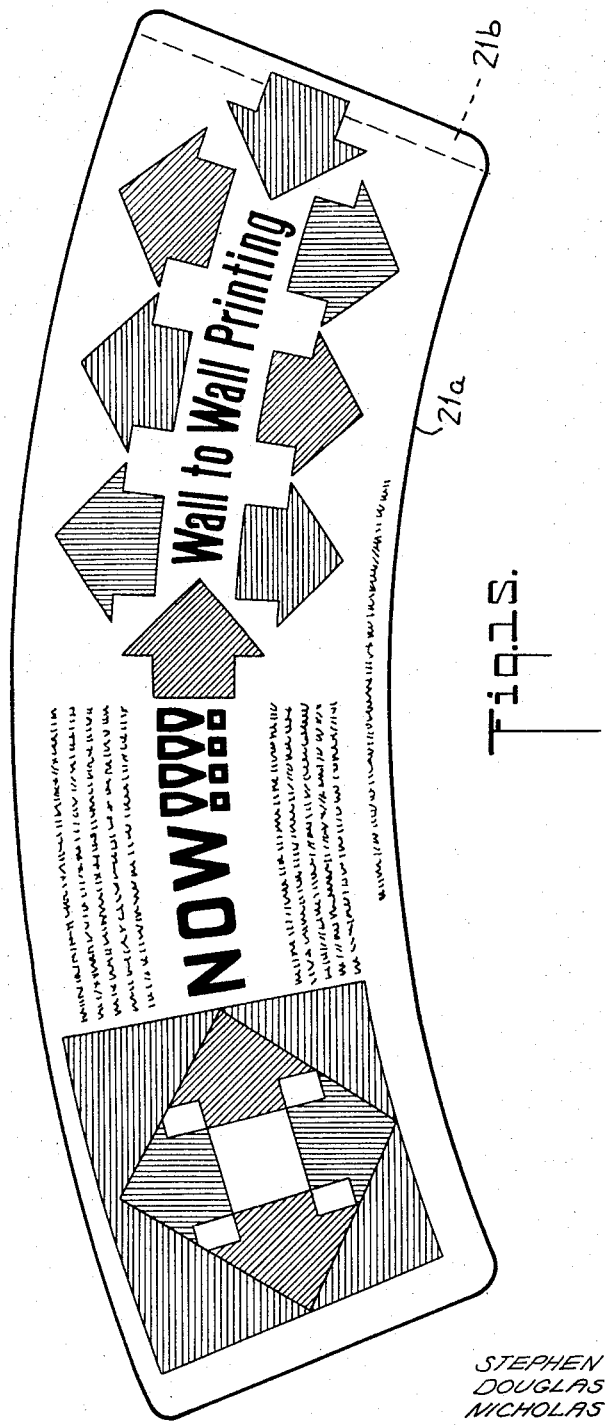
FIG. 15 is a plan view of a printed blank for the side wall member showing the extensive area to which the printing may be applied.

Referring to the drawings, and more particularly to FIGS. 1, 2 and 3: A completed container made in accordance with a preferred embodiment of the invention is designated in general as 20. In this embodiment the container is of the frusto-conical type comprising a side wall body member 21 and a bottom member 22 provided with a down-turned peripheral skirt or flange 23 disposed within the lower end portion 24 of the body member 21 with the lower marginal end portion 25 of the body folded inwardly and upwardly along the inner face of the flange 23. The container is provided with the usual rolled rim or lip 26. The side wall body member 21 and the bottom member are each formed from sheet plastic material and are intimately joined together by solvent sealing of the plastic material to provide a liquid-tight and air-tight peripheral bottom seal in the manner to be more particularly described hereinafter.

By way of example, the embodiment of the invention to be specifically described below will be a 16 oz. container made of a side member and a bottom member of .015" thick high impact polystyrene. The preferred solvent which we have found entirely satisfactory for effecting the sealing and uniting of the side wall seam and initial sealing and uniting of the bottom seam is methylene chloride. In general, chlorinated solvents are preferred for safety reasons but if proper safety precautions are taken, flammable solvents or a blend of flammable and non-flammable solvents may be used.

Before the side wall blanks are cut from the sheet plastic, the desired design is printed. This permits printing the design on the area of the blank (see FIG. 15) which will correspond to substantially the full height and circumferential extent of the container.

After printing the sheet of plastic, blanks 21a (FIG. 3) are cut and stacked in a blank magazine (not shown) forming part of the machine. As each blank is fed from the magazine, the plastic solvent S is applied along one longitudinal marginal edge as at 21b by suitable means such as by being fed under a rotating gravure applicator roll. The blank enters folder mechanism where it is automatically registered and folded at room temperature (70° F.) circumferentially around one mandrel such as A (FIG. 4) which is mounted on a rotating turret of a plurality of mandrels to overlap the opposite longitudinal marginal edge with the solvent S disposed therebetween to provide the side seam and a seam clamp mechanism (not shown) provided on the turret descends against the side seam to apply pressure for effective sealing of the side seam. The seam is held under pressure for about 3½ seconds which is sufficient to assure solvent sealing and intimately uniting of the plastic material to provide a liquid-tight and air-tight seam. The body member shell 21c is transferred from the winding mandrel into a holder (not shown) carried on an intermittently rotating turret of an assembler machine. This turret is equipped with a plurality of such holders. To facilitate forming the bottom member 22 from relatively stiff sheet plastic material, the sheet is heated to about 130° F. by passing it over a plate heated to about 160°–180° F. The bottom member 22 is then cut and drawn from the heated sheet to form the skirt portion 23. The bottom member 22 is held (FIG. 6) between members B and C conveniently carried as a part of the assembler machine on that portion known as the bottom turret. While so held, the peripheral flange 23 of the bottom is coated interiorly and exteriorly with said solvent S as by means of spray nozzles designated D and E (FIG. 6). The bottom member 22 with its flange thus coated is then placed into the body 21c (FIG. 7) in correct relation to the smaller end. At this station the lower marginal edge 25 of the shell 21c is subjected to heated air at a temperature of about 250° F. blown thereagainst by a tube F to facilitate the turn-in of this portion of the shell at the next step. The temperature of this air may be suitably varied for other plastic materials and other thicknesses.

The bottom turret members B and C are removed and the assembly of the shell 21c and bottom 22, while still positioned in the assembler cup, are moved to the next assembler station (FIG. 8) where pre-curling of the rim of the side wall member 21c is effected by a rim die member G, which in the preferred embodiment is heated to a temperature in the range of approximately 250±20° F., to facilitate this operation. It is noted that for different size of containers where the thickness of material will differ and/or where other plastic sheet material is used, this temperature should be varied accordingly. At the same time that the rim is being pre-curled, the bottom edge 25 of the shell is turned in by means of the member H which is not heated since the marginal edge of the side wall 21c has been heated with hot air supplied through the pipe F (FIG. 7) and has been softened by the solvent S (FIG. 6).

The partially assembled container, while still positioned in the assembler holder, is moved to the next station (FIG. 9) where final rimming of the upper end of the side wall member 21 is effected by means of die I which in the present embodiment is heated at a temperature in the range of 330°–360° F. It is noted that for different size containers having different material thickness and/or a different type of plastic, this temperature should be varied accordingly. At this station, at the same time that the final rimming operation is effected, the bottom marginal edge 25 of the side wall member, which was previously turned in as indicated in FIG. 8, is now rolled in by means of a tool J, which is not heated since this marginal edge has previously been softened by the heat applied as shown in FIG. 7, and by the solvent.

It is noted at this point, relative to the time element, that from the time of insertion of the bottom 22 in the side wall member 21c including the turn-in operation illustrated in FIG. 8, as well as the complete rolling operation illustrated in FIG. 9, a total of only 1⅓ seconds has elapsed. The completely assembled container is then ejected.

The means of forming the side wall seam as above described provides a liquid-tight and air-tight seam due to the solvent sealing of the parts together. However, under high speed operating conditions, and especially where the plastic material has a thickness of the order used in the preferred embodiment herein described, it has been found that it is difficult to consistently assure a liquid-tight and air-tight bottom seal when reliance is placed entirely upon the application of solvent and a pressing of the parts together as above described. In other words, it has been found that small crevices are apt to occur in the bottom peripheral seal and in order to assure the formation of a dependable peripheral seal, the following method has been devised to provide a supplemental seal.

A controlled quantity of a supplemental solvent for the plastic material is applied to the juncture between the side wall bottom end and the periphery of the end member. The application should be such that the supplemental solvent flows into the joint and any crevices present and is absorbed by the plastic surfaces causing them to swell and soften to a "tack" point so that a direct adhesion of the surfaces results. We have found that this supplemental solvent should be slower acting than the solvent initially used. For example, the supplemental solvent, herein designated as S2, which we have found entirely satisfactory for this post sealing operation is a 50%–50% by volume mixture of Vythene (1,1,1-trichlorethane) and methylene chloride. This supplemental solvent is applied by relative motion between the solvent and container, preferably while the axis of the latter is tipped at an angle to the horizontal so as to assure contact of the supplemental solvent and said juncture. This may be effected by rotating the container relative to a spray nozzle or rotating a spray nozzle relative to the container. By way of example, we have found the following procedure to be satisfactory.

The assembled container 20 (FIG. 10) is positioned in a suitable holder K with the longitudinal axis of the container held at an angle of about 15° above the horizontal while a small amount of the solvent S2 is poured into the container through the spout L while the holder K rotates the container at a speed of about 15 r.p.m. for 3 to 5 revolutions to thus distribute the solvent evenly over the bottom corner formed at the juncture between the side wall 21 and bottom 22. The amount of solvent and speed of rotation are critical in order to effect a proper seal but to avoid having the solvent attack the plastic material to an extent where it will weaken the container or actually go through the side wall, while on the other hand, insufficient solvent will not provide a proper supplemental seal. The amount of supplemental solvent required will be proportional to the bottom seam circumference and we have found that in the 16 oz. container herein described by way of example, the amount of said solvent should be 0.25±0.05 ml.

In general, the speed of rotation of the container should not be sufficiently great to cause the solvent, due to centrifugal force, to "creep" up the side wall of the container but should remain pocketed at the juncture of the shell and the bottom until it has been absorbed by the plastic side wall and bottom flange to swell and soften the contiguous surfaces and provide the supplemental seal, designated in FIG. 2 as SS, on a somewhat exaggerated scale. Any amount of centrifugal force would tend to drive the solvent away from the axis of rotation and thus up the side wall. Therefore we desire the lowest rate of speed to allow the solvent to flow by gravity down into the bottom crevice. The rotation of the container is only to spread the solvent around the circumference of the bottom joint and its speed must be such that the resulting centrifugal force on the solvent is less than the force of gravity. Otherwise the liquid would not flow down into the bottom joint which, by design, tapers inward toward the axis of rotation. After sufficient solvent absorption and evaporation, the container could be held in any position. It is noted that if the solvent is deposited in gradual streams at spaced intervals, the speed of rotation may exceed 300 r.p.m. since the solvent would in effect be deposited in spaced spirals from which it would be gradually spread to cover the desired area.

Instead of depositing the supplemental sealing solvent S2 within the container between the container body and bottom as described in connection with FIG. 10, or in addition thereto if desired, the supplemental sealing solvent S2 may be deposited on the underside of the container between the inturned bottom margin 25 and the bottom flange 23 as indicated in FIGS. 12, 13 and 14. The resulting supplemental seal being indicated in FIG. 14, on a somewhat exaggerated scale, as SS'. This is particularly important where the inturned marginal end 25 of the body member is not folded up the full width of the bottom flange 23.

*Modified application of solvent for peripheral bottom seam*

Instead of applying the plastic solvent S to both the interior and exterior faces of the bottom flange 23, as described in connection with FIG. 6, the solvent may be applied to the interior of the side wall blank along the lower marginal edge so that when the blank is folded into the shell 21c as shown in FIG. 4, the inner face of the marginal edge 25 will be coated as shown at 21S in FIG. 5, and in such case the flange 23 of the bottom member 22 will be coated only on its outer surface as shown at 22S. The solvent applied to the interior of the marginal end 25 will of course come into engagement with the interior of the peripheral flange 23 of the bottom 22 so that in effect the solvent will be applied to the inner and outer surfaces of the flange 23 disposed between the inturned lower end and the oppositely disposed portion of said shell.

After the supplemental solvent sealing SS has been applied to the peripheral bottom flange as shown in FIGS. 2 and/or 14, the fabrication of the container is complete but the side wall 21 of the container is subject to crazing or cracking due to tension strains as heretofore mentioned. These strains are localized adjacent the outer surface and extend for about one-half the thickness of the side wall. It is known in general that strains in plastic material may be relieved by annealing; but such annealing of a fabricated container of the character described presents difficulties. For instance, subjecting the entire container to heat would deleteriously affect the structure and may cause it not only to be weakened but to become deformed or even collapse or fall apart. We have found that such tension strains may be safely relieved or removed by subjecting the exterior surface of the side wall and adjacent strata where the strains are more or less localized to a controlled temperature without adversely affecting the container structure.

By way of example, the presently preferred procedure set forth below has proven entirely satisfactory.

The container is suitably held, as by means of a holder such as K (FIG. 10) and is rotated about its axis while moved in a linear direction past an infrared heater having a wave length of about 3.2 microns and a density of 22 watts to expose substantially the entire external surface of the side wall to said heat. The duration of such exposure should be about 5 seconds, it being noted that since the container rotates relative to the heat source, less than one-half of its circumference is under its influence. The other half is what might be called the "dark side." Therefore, the 5 seconds of time interval means that the container must be rotated to allow every portion of its periphery to be in the general direct heat rays for at least 5 seconds, during which the surface should be within 1″ to 2″ distance from the heat source. As the distance is increased, more exposure time would be required. This will serve to raise the temperature of the exterior surface of the side wall to about 210±10° F. (for high impact polystyrene material of about .015″ thickness) which effectively heats the outside surface and adjacent strata to about one-half of its thickness without substantially affecting the other parts of the container. At this exterior temperature the interior temperature will be about 190±10° F. For materials of other thicknesses the same temperature is used but the time is decreased or increased in accordance with a decrease or increase in thickness.

Heating the side wall as above described will largely remove the odor of the solvent, but such removal will be augmented by passing the container through an air tunnel which will also serve to cool the containers so that they may be more speedily handled and packed.

Having thus described our invention with particularity with reference to presently preferred embodiments thereof, it will be obvious to those skilled in the art, after understanding our invention, that various changes and modifications may be made therein without departing from the spirit and scope of our invention, and we aim in the appended claims to cover such changes and modifications as fall within the scope of the invention.

What we claim is:

1. A fabricated plastic container comprising a side wall shell and a bottom member, said shell comprising a circumferentially folded sheet of non-cellular plastic material having overlapped longitudinal marginal edges solvent sealed and thereby directly and intimately united together and forming a liquid-tight and air-tight side seam, the outer surface of said folded sheet of plastic material being in a heat-annealed condition whereby it is free of tension strains, and said bottom member being of non-cellular plastic sheet material, the lower end of said shell and the periphery of said bottom member presenting cofacing portions having initially contiguous areas, said cofacing portions being intimately and directly united together by first and second solvent seals which together provide a liquid-tight and air-tight peripherally extending seal between said shell and said bottom member, said first solvent seal being between said initially contiguous areas, and said second solvent seal being between otherwise existing crevices between said cofacing portions.

2. A fabricated plastic container according to claim 1 in which the lower end of said shell has a portion extending inwardly and upwardly, said bottom member having a downwardly extending peripheral flange disposed between the interior of the lower end of said shell and its adjacent inwardly and upwardly extending end portion thereby providing respectively cofacing portions having initially contiguous areas between said flange and said lower and upwardly extending end portions of said shell, said first solvent seal being between said initially contiguous areas between said flange and said lower and upwardly extending end portions of said shell, and said second solvent seal providing swollen areas of said cofacing portions which are intimately and directly united together, said swollen areas being at least between the outer surface of said bottom flange and said interior of the lower end of said shell.

3. A container according to claim 1 in which said plastic sheet material of said shell is high impact polystyrene.

4. A container according to claim 3 wherein said plastic sheet material of the bottom member is also high impact polystyrene.

5. A fabricated plastic container comprising a side wall shell and a bottom member, said shell comprising a circumferentially folded sheet of non-cellular plastic sheet material having overlapped longitudinal marginal edges solvent sealed and thereby directly and intimately united together and forming a liquid-tight and air-tight side seam extending to the lower end of said shell, said bottom member being of non-cellular plastic sheet material, the lower end of said shell and the periphery of said bottom member presenting cofacing portions having initially contiguous areas and initially non-contiguous areas, said non-contiguous areas defining crevices between said shell and said bottom member including a side seam juncture crevice defined by the non-contiguous relation between said cofacing portions immediately adjacent to the edge of the innermost of said overlapped longitudinal marginal edges of said shell at its said lower end, said cofacing portions being intimately and directly united together by first and second solvent seals which together provide a liquid-tight and air-tight peripherally extending seal between said shell and said bottom member, said first solvent seal being between said initially contiguous areas, and said second solvent seal being between said initially non-contiguous areas and providing swollen areas of said cofacing portions which are intimately and directly united together thereby closing and sealing said crevices including said side seam juncture crevice.

References Cited
UNITED STATES PATENTS

| | | | |
|---|---|---|---|
| 2,125,848 | 8/1938 | Miller | 93—36.5 |
| 2,917,215 | 12/1959 | Psaty et al. | 229—1.5 |
| 3,312,383 | 4/1967 | Shapiro et al. | 229—1.5 |
| 3,327,895 | 6/1967 | Mueller | 229—1.5 X |

JOSEPH R. LECLAIR, *Primary Examiner.*

U.S. Cl. X.R.

220—67; 229—1.5, 5.6